C. W. REED.
Improvement in Pitman-Connection for Operating Cranks.
No. 130,596. Patented Aug. 20, 1872.
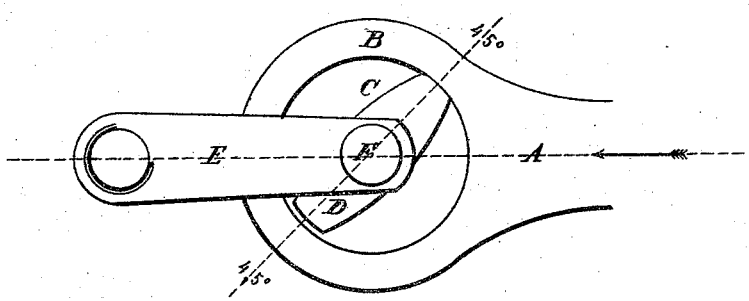
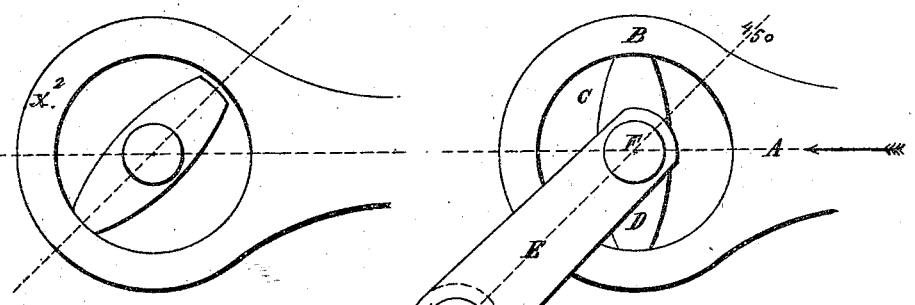
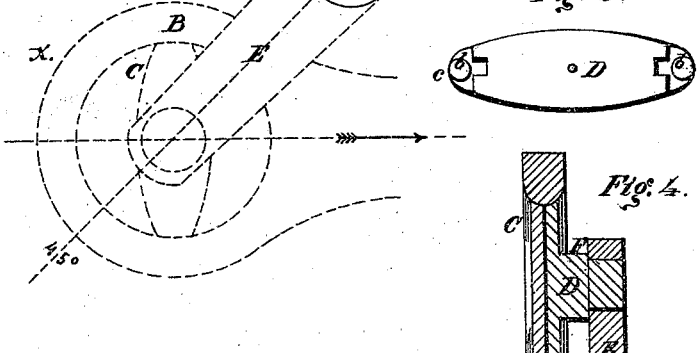
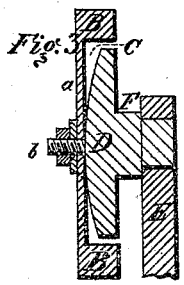
Witnesses:
Wm J Keyton.
H. W. Brockmorton.
Inventor:
Cullin W Reed.
By James L. Norris
Atty.

UNITED STATES PATENT OFFICE.

CULLIN W. REED, OF CHAGRIN FALLS, OHIO.

IMPROVEMENT IN PITMAN CONNECTIONS FOR OPERATING CRANKS.

Specification forming part of Letters Patent No. 130,596, dated August 20, 1872.

SPECIFICATION.

Be it known that I, CULLIN W. REED, of Chagrin Falls, in the county of Cuyahoga and State of Ohio, have invented certain new and useful Improvements in Pitman Connection for Operating Cranks, of which the following is a specification:

This invention has for its object to connect a pitman with a crank or fly-wheel of a machine in such a manner as to overcome and prevent what is termed "dead-center." My invention consists in overcoming and preventing "dead-center" in machinery by combining a pitman with a crank, said pitman communicating a smooth uninterrupted rotary motion to a crank or fly wheel through the medium of a bar or its equivalent, said bar being arranged in such respect to the pitman and crank as to stand at about an angle of forty-five degrees to each, when the same are in a straight line with each other during the forward-and-back stroke of the pitman. The invention further consists in arranging, in an annular recess or socket of a pitman connection, a bar or its equivalent, the end or ends of which engage upon the inner periphery of the said recess or socket in such a manner that if the said bar be rigidly connected with or upon a crank or fly-wheel, and motion imparted to said pitman a rotary motion will be communicated to the said crank or fly-wheel, and all liability of dead-center be overcome and prevented. The invention further consists in connecting a crank or fly-wheel with a pitman by means of a bar or its equivalent, said bar being rigidly secured upon or connected with the crank or fly-wheel at or about an angle of forty-five degrees, so that the inner periphery of the recess or socket of the pitman, in its forward and back stroke, will act alternately upon the ends of the bar, except when the bar is at about right angles to the longitudinal direction of the pitman, and the crank at an angle of forty-five degrees to the pitman, at which point in the stroke or revolution the inner periphery of the recess or socket acts upon both ends of the bar, and perform the important and essential office of lifting and driving the crank, in such a manner as to impart rotary motion to the said crank or fly-wheel and overcomes and prevents dead-center. The invention further consists in making the bar, or its equivalent, that connects the crank and pitman together, expansible, so as to compensate for the wear of the inner surface of the recess or socket and the ends of the bar. The invention further consists in providing the ends, either or both, with friction-rollers.

In the drawing, Figure 1 is a vertical side view of a pitman-crank and connecting-bar, the crank and pitman being in line with each other and the bar at an angle of forty-five degrees to each. Fig. 2 is a similar view, showing the parts in their relative position, the pitman moving forward, the crank being at an angle of forty-five degrees to the pitman. Fig. 3 is a section of the pitman, the crank, and bar. Fig. 4 is a modification of the connecting-bar. Fig. 5 is a top view of an expansible bar, showing friction-rollers.

Like letters of reference indicate corresponding parts.

In the drawing, the letter A designates a pitman, the rear end of which is connected with any desired gearing or driving power. The head B of the pitman is formed either with an annular recess or socket extending partly through it, so as to leave a wall, $a$, as in Fig. 3, or the same may be formed with an annular opening or socket extending entirely through it, as in Fig. 4. Within the annular space is arranged a bar, D, or its equivalent, which will, in most instances, be hung or journaled at its center to the wall $a$ of the head B by a fastening, $b$, or the ends of the said bar and the internal peripheral surface of the recess or socket may be formed with V-shaped surfaces, so as to coincide with each other to confine the bar in place and to permit of the latter having a free rotation. In the present instance I have shown a crank, E, connected with a pitman by a bar, D; but it is evident that the invention is applicable to fly-wheels, and to such special claim is made. This crank is connected directly with the bar, or through the medium of a pitman-pin or wrist-pin, F, by suitable fastenings. In either case it is rigidly connected, so that when said bar is rotated or revolved it will carry with it and impart rotary motion to said crank, whereby requisite motion is communicated to the machine or machinery desired to be driven. To compensate for wear of the internal periphery of the recess or socket C and the ends of the bar D, the same will, in some instances, be rendered expansible by inserting wedges or keys between the divided portions c d, or by other suitable and practical means, and, in some instances, rollers e and f will be arranged in the ends of the bar for the purpose of diminishing friction; but to such the construction of the bar is not restricted. The bar D may have its inside face portion slightly rounded or convex, as shown in Fig. 3, so as not to impinge or bear upon the inside of the wall a for the purpose of lessening friction between the said wall and bar.

The operation of my invention is as follows: Motion being imparted to the pitman, supposing the parts to occupy the position shown in Fig. 1, and on dead-center, the pitman moving forward in direction of the arrow, the inner peripheral surface of the recess or opening C upon the top impinges the upper end of the bar, and by such impinging raises the crank from its dead-center and drives it upward and around, as shown in dotted lines x x, Fig. 3, at which point both ends of the bar have equal bearings upon the inner periphery of the recess C, when, by further movement of the pitman it moves to the position of dead-center, as shown by dotted lines, Fig. 1, and is carried past as before mentioned.

Having thus described my invention, what I claim, and desire to secure by Letters Patent, is—

1. A pitman, connected with a crank or fly-wheel by a bar, D, or its equivalent, for overcoming and preventing "dead-center," said bar adapted to rotate in a space formed in the head of the pitman, substantially as described.

2. A bar, D, or its equivalent, secured at an angle of about forty-five degrees upon a crank or fly-wheel, for the purpose of receiving and transmitting motion of a pitman, substantially as described.

3. A bar, D, or its equivalent, adapted to revolve in an annular space in the head of a pitman, substantially as described.

4. The combination of a pitman, a revolving bar, D, or its equivalent, and a crank or fly wheel, the parts being arranged for operating substantially as described, for overcoming and preventing dead-center.

5. An expansible rotary bar, or its equivalent, arranged within an annular space in the head of a pitman, substantially as described.

6. A bar, D, or its equivalent, provided with friction-rollers and arranged within an annular space in the head of a pitman, said bar adapted to rotate substantially as described.

In testimony that I claim the foregoing I have hereunto set my hand this 8th day of August, 1872.

CULLIN W. REED.

Witnesses:
ALBERT H. NORRIS,
JAMES L. NORRIS.